US006859160B1

(12) United States Patent
Gounalis

(10) Patent No.: US 6,859,160 B1
(45) Date of Patent: Feb. 22, 2005

(54) SYSTEM FOR ESTIMATING RECEIVER UTILIZATION

(75) Inventor: Anthony J. Gounalis, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/658,500

(22) Filed: Sep. 9, 2003

(51) Int. Cl.$^7$ ............................................. G01S 7/285
(52) U.S. Cl. ........................................ 342/13; 342/89
(58) Field of Search ................................ 342/13, 16–19, 342/88, 89, 192, 195

(56) References Cited

U.S. PATENT DOCUMENTS

| | | | |
|---|---|---|---|
| 4,608,701 A | 8/1986 | Burgers et al. | 369/32 |
| 4,695,790 A | 9/1987 | Mathis | 324/76.36 |
| 5,020,411 A | 6/1991 | Rowan | 89/1.11 |
| 5,381,150 A | 1/1995 | Hawkins et al. | 342/13 |
| 5,610,609 A | 3/1997 | Rose | 342/13 |
| 5,689,274 A | 11/1997 | Rose | 342/417 |
| 5,708,443 A | 1/1998 | Rose | 342/91 |
| 5,774,087 A | 6/1998 | Rose | 342/13 |
| 5,847,677 A | 12/1998 | McCorkle | 342/204 |
| 5,884,294 A | 3/1999 | Kadar et al. | 706/10 |
| 5,914,687 A | 6/1999 | Rose | 342/424 |
| 5,999,129 A | 12/1999 | Rose | 342/394 |
| 6,163,297 A | 12/2000 | Rose | 342/418 |
| 6,177,904 B1 | 1/2001 | Coenen et al. | 342/62 |
| 6,297,773 B1 | 10/2001 | Fullerton et al. | 342/457 |
| 6,313,794 B1 | 11/2001 | Rose | 324/76.31 |
| 6,366,236 B1 | 4/2002 | Farmer et al. | 342/195 |
| 6,411,249 B1 | 6/2002 | Rose | 342/13 |
| 2004/0133380 A1 * | 7/2004 | Gounalis | 702/127 |
| 2004/0135717 A1 * | 7/2004 | Gounalis | 342/13 |

OTHER PUBLICATIONS

"Specific emitter identification (SEI) and classical parameter fusion technology", Langley, L.E.;WESCON/'93. Conference Record, , Sep. 28–30, 1993 pp.:377–381.*

* cited by examiner

Primary Examiner—John B. Sotomayor
(74) Attorney, Agent, or Firm—Tarolli, Sundheim, Covell & Tummino L.L.P.

(57) ABSTRACT

A system estimates the utilization of an electromagnetic signal receiver. The system includes a detection module and a processing module. The detection module receives electromagnetic signals from a surrounding environment. The electromagnetic signals are chronologically segregated into a plurality of dwells each with an elapsed time. The processing module controls the scanning of the surrounding environment. The processing module receives data about the signals from the detection module. The processing module computes a plurality of utilizations by dividing each individual elapsed time by a predetermined sample interval. The processing module further determines a total utilization by adding the plurality of utilizations.

20 Claims, 5 Drawing Sheets

SYSTEM FOR ESTIMATING RECEIVER UTILIZATION

FEDERAL SPONSORSHIP

The U.S. Government has a paid-up license in this invention and the right, in limited circumstances, to require the patent owner to license others on reasonable terms as provided for by the terms of Contract No. N0001997-C-0147 awarded by the U.S. Navy.

FIELD OF INVENTION

The present invention relates to a system for signal processing and, more specifically, a system for estimating receiver utilization.

BACKGROUND OF THE INVENTION

Typically, transmitted signals are collected by a receiver and processed during predetermined time intervals called dwells. The processing of signals received during a previous dwell occurs during a subsequent dwell. An inter-dwell period exists between dwells to allow for the reconfiguration of data processing circuits and other hardware in response to the processed data of the most recent dwell. Any processing of received signals or collecting of received signals is typically halted during this inter-dwell period.

The scan status of an electronic support measure (ESM) receiver or an electronic intelligence (ELINT) receiver is conventionally expressed via a utilization metric, which is defined as the sum of individual dwell durations divided by individual dwell revisit times. Direct measurement of the utilization metric is typically not possible. The utilization metric may be estimated by adding an assessment dwell to the scan strategy with an assigned revisit time. The assigned revisit time may be the last dwell (the longest revisit time dwell) executed in the scan strategy. Each time this assessment dwell executes, the utilization metric is computed as the time elapsed between successive assessment dwell executions divided by the assessment dwell's assigned revisit time.

This process of estimating the utilization metric is accurate, but suffers from large delays associated with inability to control the utilization estimate update rate. In order to control and specify the update rate to provide timely utilization updates for display to an operator, a specific need exists for removing the conventional restriction of requiring the assessment dwell to be the slowest dwell in the scan strategy, thereby allowing the selection of an arbitrary update rate.

SUMMARY OF THE INVENTION

In accordance with the present invention, an example system for estimating the utilization of an electromagnetic signal receiver includes a detection module for receiving electromagnetic signals from a surrounding environment. The electromagnetic signals are chronologically segregated into a plurality of dwells each with an elapsed time. A processing module controls the scanning of the surrounding environment. The processing module receives data about the signals from the detection module. The processing module computes a plurality of utilizations by dividing each individual elapsed time by a predetermined sample interval. The processing module further determines a total utilization by adding the plurality of utilizations.

An example computer program product in accordance with the present invention estimates the utilization of an electromagnetic signal receiver. The product includes a first instruction for receiving electromagnetic signals from a surrounding environment; a second instruction for creating data from the electromagnetic signals; a third instruction for chronologically segregating the electromagnetic signals into a plurality of dwells each with an elapsed time; a fourth instruction for controlling the scanning of the surrounding environment; a fifth instruction for computing a plurality of a utilizations by dividing each individual elapsed time by a predetermined sample interval; and a sixth instruction for determining a total utilization by adding the plurality of utilizations.

An example method in accordance with the present invention estimates the utilization of an electromagnetic signal receiver. The method includes the steps of: receiving electromagnetic signals from a surrounding environment; creating data from the electromagnetic signals; chronologically segregating the electromagnetic signals into a plurality of dwells each with an elapsed time; controlling the scanning of the surrounding environment; computing a plurality of a utilizations by dividing each individual elapsed time by a predetermined sample interval; and determining a total utilization by adding the plurality of utilizations.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Electronic support measure (ESM) receiver systems typically are ground based, airborne, or sea based (surface or sub-surface platforms) systems that passively detect threat signals of interest, typically radar and communication signals. An ESM system identifies, classifies, and prioritizes detected signals for display to an operator or crew. The goal is to provide the crew with a tactical picture, or "situational awareness", of the electromagnetic environment around them, such that the crew may react and counter any threats (e.g., maneuver, apply counter measure, attack, etc.). Since signal detection is passive (only receiving), an ESM receiver cannot be detected (i.e., an operator of a threat does not know that the ESM is in operation or that the threat has been detected, identified, and possibly located, etc.).

Figure 1:
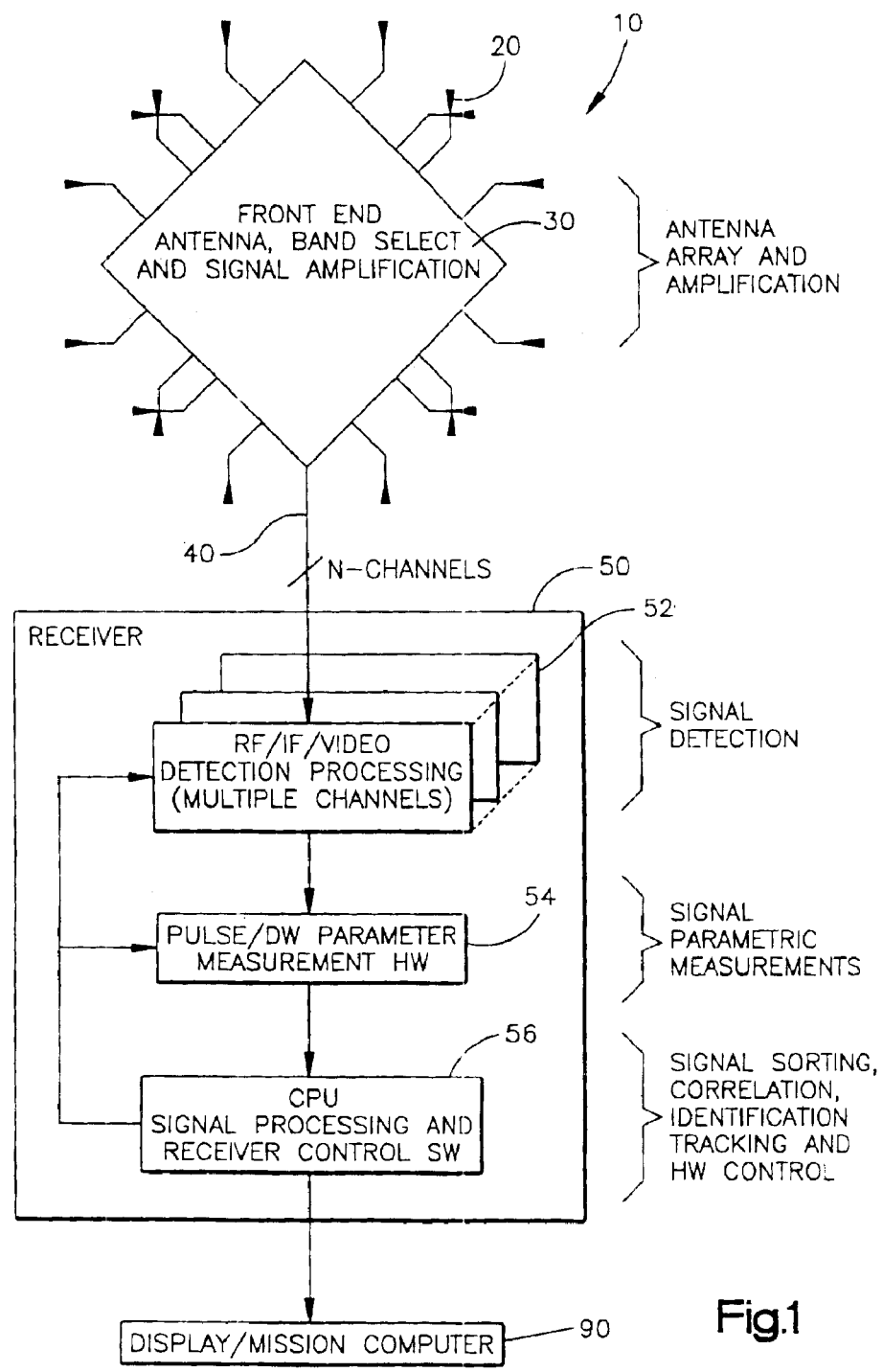
FIG. 1 is a schematic representation of an example system for use with the present invention.

Although there are many variations, a typical ESM receiver system 10, as seen in FIG. 1, consists of an antenna array 20, low noise preamplifier 30, antenna cables 40, a receiver 50, and display 90. The antenna array 20 is arranged to provide a 360 degree field of view and direction of arrival information. In some applications, a rotating "dish" antenna may be used.

The receiver 50 may typically be a super-heterodyne receiver with one or more channels switched among the antenna array inputs. The receiver 50 may include a detection module 52 and a signal parametric measurement module 54 (i.e., angle of arrival, frequency, modulation, etc.). The receiver 50 may also include one or more CPUs 56 that are tasked with running software for controlling how the electromagnetic environment is scanned for signal detection and for identifying, prioritizing, and tracking detected signals. Signal detection, or "emitter reports", are then provided directly to the display 90 or are reported to a computer for post-processing and further display.

Some applications of ESM receivers may include self-protection, surveillance, and strike package support. Self-protection receivers are typically referred to as Radar Warning Receivers (RWR). The goal of RWR systems is to detect radar signals that control weapons and may harm the vehicle and crew. RWR's require very rapid detection times to allow the crew as much time as possible to counter or evade a threat.

Surveillance receivers provide a tactical picture of the electromagnetic environment. The goal is to determine the classification, bearing, and location of all signals within a region of interest. This may include passive tracking of commercial shipping, or the passive detection and location of hostile submarines. Electronic Intelligence (ELINT) collection is a somewhat more dangerous variation of surveillance.

For strike package support, enemy air defenses may be countered with airborne jammers, which react and focus the jammer power at the signals detected by the ESM receiver. This "Electronic Attack" degrades performance of the detected defenses such that strike aircraft may complete their mission and return safely.

As stated above, software is responsible for detecting, identifying, and reporting signals, as well as for controlling the scan of the electromagnetic environment. Scanning the environment requires that the receiver hardware be periodically commanded to "look" in the appropriate frequency band(s) for a period of time consistent with the signal of interest characteristics expected within the band. This is referred to as a "dwell". There may be one or more dwells, depending on the application and signal of interest characteristics. For example, the RWR function typically looks for a limited set of signals, and can often be configured to "stare" in a particular frequency band.

In contrast, the surveillance function may require a broad frequency range to be scanned, requiring many dwells with different dwell characteristics to satisfy a diverse set of signal parameters. These dwells may have different "look rates" or "revisit times", as well as dwell durations. Also, the dwell duration may consist of the minimum sample time and an extended time for data collection. The extended time cannot be predicted since the extended time is variable and driven by environmental detections. Thus, the time to perform the scan is highly variable.

Measuring the time to complete a scan cycle divided by an "ideal" cycle time is referred to as "Receiver Utilization" and provides an important output to the operator. The operator will infer "system health" based on this parameter. A large value implies that the receiver is bogging down, and that the scan strategy may need to be modified. A small value implies that rapid detection times are likely.

Figure 2:
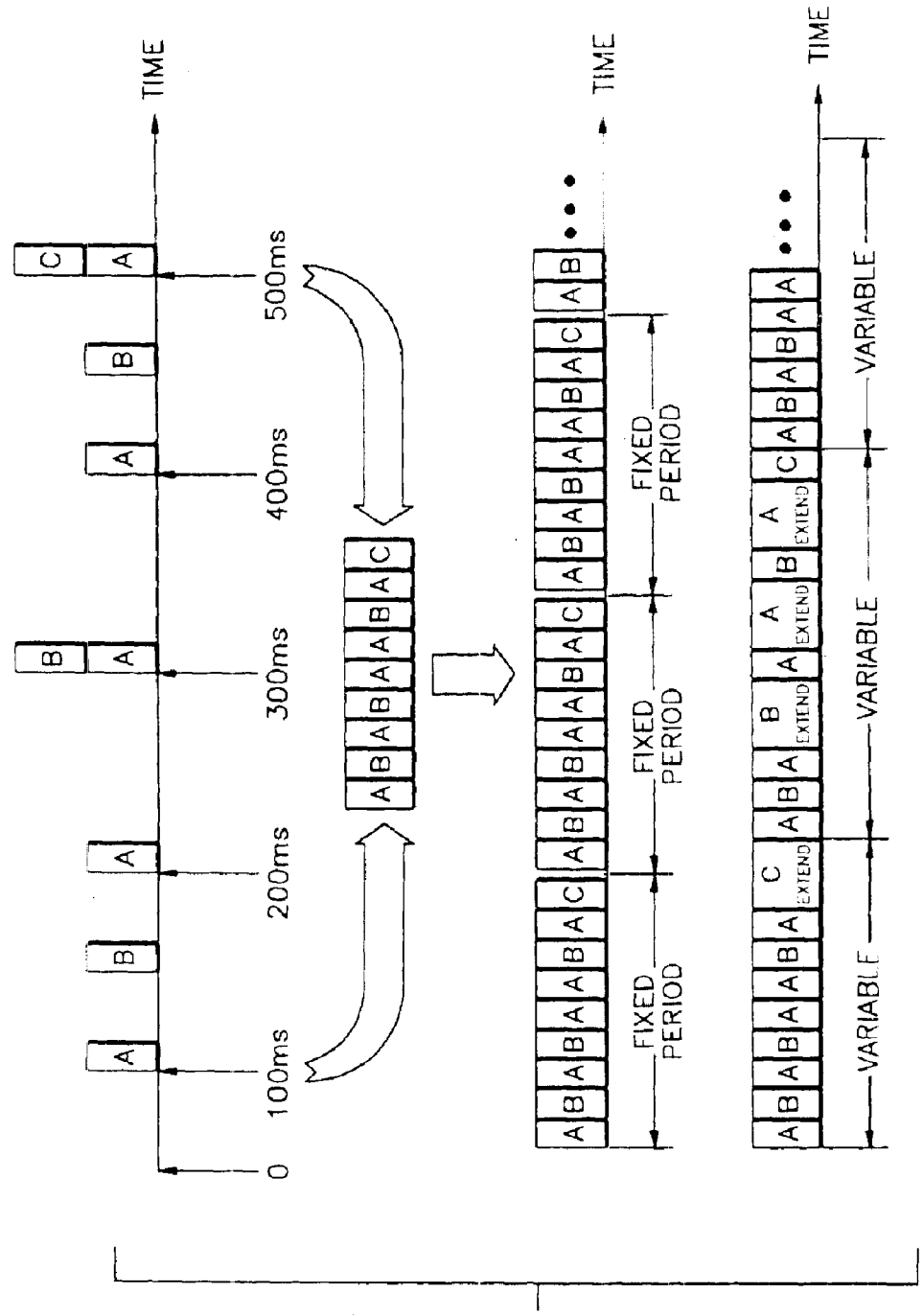
FIG. 2 is a schematic representation of an example system for use with the present invention.

The hardware configuration of a receiver system may also be varied to optimize detection (i.e., matched filtering, etc.). Given a set of dwells, the software is tasked with generating the dwell sequence and commanding the hardware for each dwell. If the set of dwells has the same revisit time, then the control software simply steps through the sequence. For example if the receiver is given 3 dwells A, B, and C with the same revisit time, then the execution order would be ABCABCABCABC . . . . If the dwells have different revisit times, then the execution order is driven by the relative revisit times, as seen in FIG. 2.

A pseudo-random dwell sequence of ABABAABAC is generated. For scan strategies consisting of tens or hundreds of unique dwells, the dwell sequence may lengthen dramatically. Note that regardless of the length, the minimum time to traverse the sequence is the sum of the dwell durations of the sequence, and that the end of the sequence is always indicated by the execution of the "slowest" dwell (dwell C in the example of FIG. 2).

Figure 3:
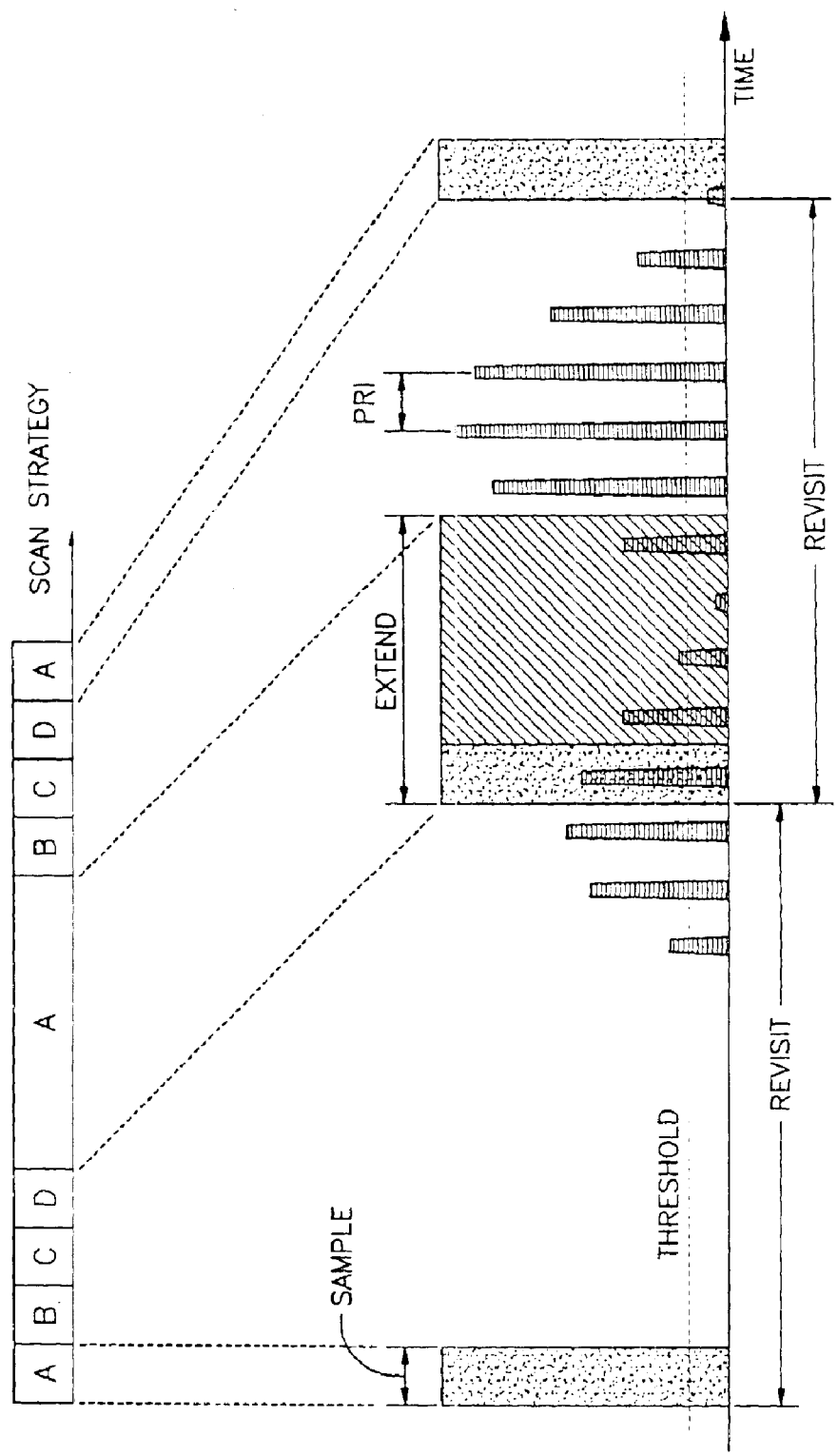
FIG. 3 is a schematic representation of an example system for use with the present invention.

The dwell duration may consist of the minimum sample time and an extend time for data collection (see FIG. 3). Since the extend time is variable and driven by environment detections, it cannot be predicted. This means that the time to perform the scan is highly variable. This is shown by the third "trace" of FIG. 2. Comparing the ratio of the Variable Period to the Fixed Period yields a measurement that indicates how successful the receiver is in meeting the desired dwell rates. As stated above, measuring the time to complete the scan cycle (Variable Period) divided by an "ideal" cycle time (Fixed Period) is referred to as "Receiver Utilization" and provides an important input to the operator. The operator will infer "system health" based on this parameter. A large value (greater than 1.0) implies that the receiver is bogging down, and that the scan strategy may need to be modified. A small value (1.0 or less) implies that rapid detection times are likely.

Figure 4:
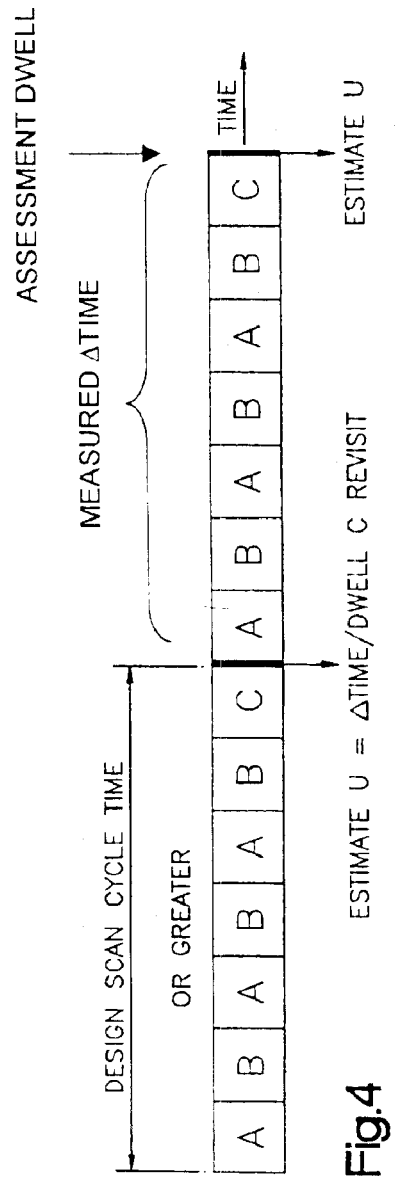
FIG. 4 is a schematic representation of an example system for use with the present invention.

The dwell sequence may become very long for large numbers of dwells. Thus, determining the end of the sequence and tabulating cycle time directly may be difficult, especially if the dwell table is a system variable. However, since the execution of the longest revisit time dwell is an indicator of the sequence end, the standard approach to estimating Receiver Utilization adds a marker dwell with a revisit time equal to the largest revisit time of all the dwells. This is termed the Assessment Dwell. Receiver Utilization is then computed and logged each time the Assessment Dwell is executed, and is computed as the time elapsed since the last execution of the Assessment Dwell divided by its assigned revisit time (see FIG. 4).

Figure 5:
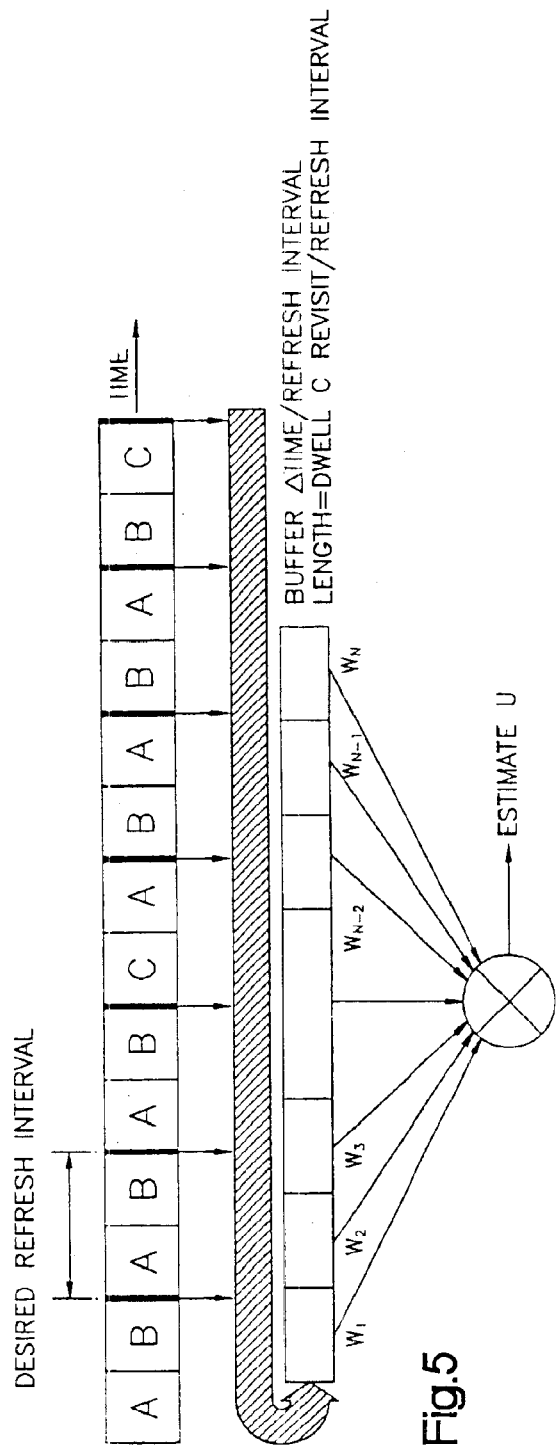
FIG. 5 is a schematic representation of an example system in accordance with the present invention.

The problem with this approach is that Receiver Utilization estimates cannot be made any faster than the slowest dwell in the sequence. This has two affects: 1) if the Receiver Utilization drives an operator's console, then the data refresh rate is dependent upon the dwell table composition; and 2) under "lagging" conditions, the data display may appear to "freeze". From an operator's point of view, the update rate should be timely and reasonably constant. A system 100 for estimating receiver utilization in accordance with the present invention achieves a timely and reasonably constant "refresh rate", which is the Assessment Dwell's Revisit Time. The Revisit Time is specified and data collection is adjusted to maintain the fidelity of the estimate, as seen in FIG. 5.

Figure 6:
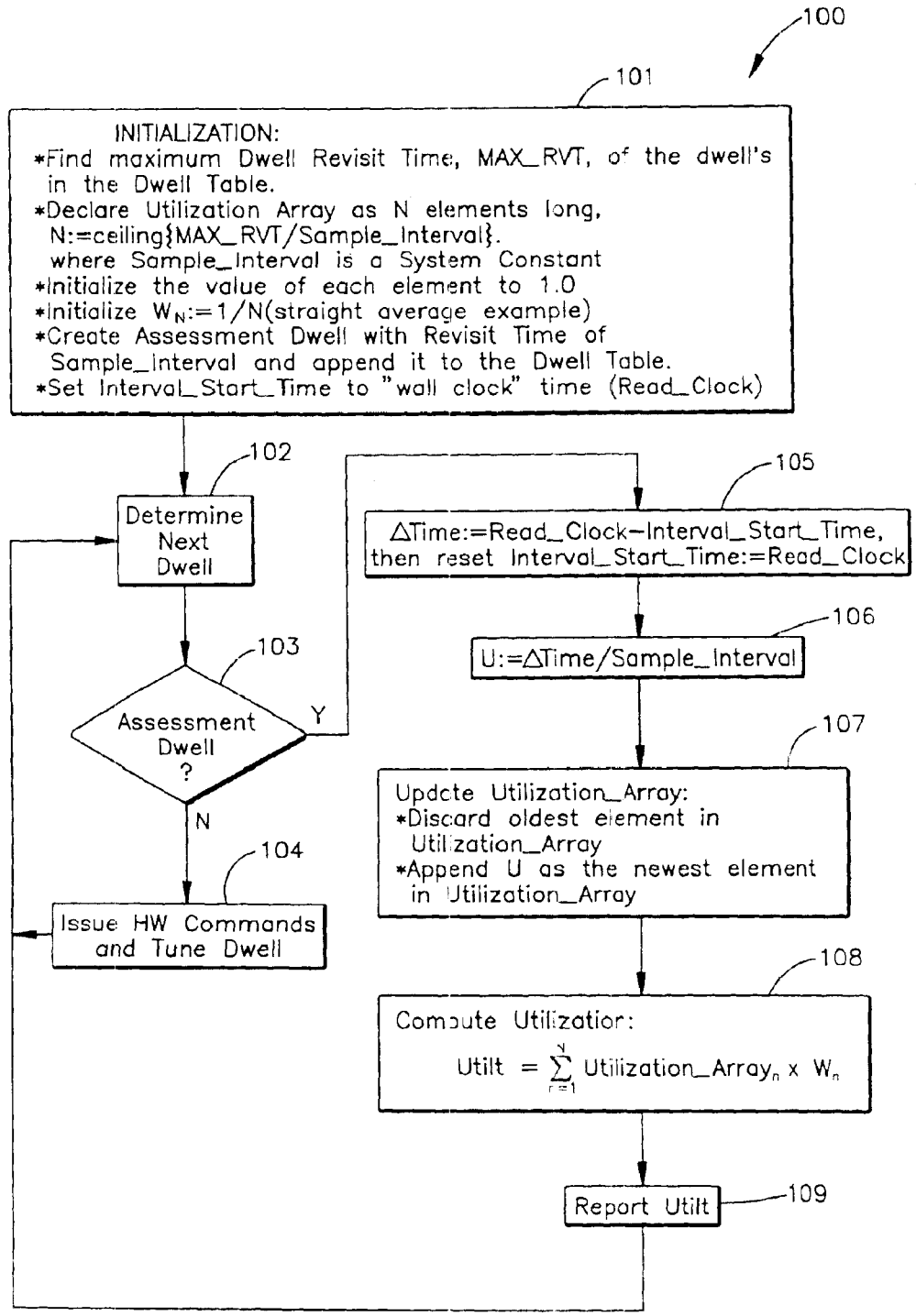
FIG. 6 is a schematic representation of an example system in accordance with the present invention.

As seen in FIG. 6, the system 100 is based on the observation that the Receiver Utilization may be estimated once per cycle or sampled N times per cycle, so long as at least N sample values are used in the estimate. This allows the use of an arbitrary refresh rate (or refresh interval), provided the appropriate minimum number of samples are buffered. The value of the weights ($W_N$) may be selected to condition the buffer data or simply a straight average may be calculated (i.e., $W_N=1/N$). Note that the N sample delay to the first accurate Receiver Utilization estimate is no worse than the standard delay of one full dwell sequence.

An example algorithm for use with a receiver system 100 in accordance with the present invention is shown in FIG. 6. In step 101, the system 100 initializes. The system 100 finds a maximum dwell Revisit Time, MAX_RVT, of the dwells in a Dwell Table. The system 100 declares a Utilization Array as N elements long with N=ceiling [MAX_RVT/Sample_Interval] where Sample_Interval is a System Constant. The system 100 initializes the value of each element at 1.0. The system 100 initializes $W_N=1/N$ (i.e., a straight average in the example). The system 100 creates an Assessment Dwell with a Revisit Time of Sample_Interval and appends the Revisit Time to the Dwell Table. The system 100 sets Interval_Start_Time to "wall clock" time (Read_Clock). Following step 101, the system 100 proceeds to step 102.

In step 102, the system 100 determines a next dwell, Next_Dwell. Following step 102, the system 100 proceeds to step 103. In step 103, the system 100 determines if the Next_Dwell is the Assessment Dwell. If Next_Dwell is not the Assessment Dwell, the system 100 proceeds to step 104. In step 104, the system 100 issues hardware commands and adjusts the frequency being monitored appropriately (i.e., tuning the dwell). Following step 104, the system 100 proceeds back to step 102.

In step 103, if Next_Dwell is the Assessment Dwell, the system 100 proceeds to step 105. In step 105, the system 100 sets ΔTime at Read_Clock−Interval_Start_Time and then resets Interval_Start_Time at Read_Clock. Following step 105, the system 100 proceeds to step 106. In step 106, the system 100 computes a single utilization U of one dwell at ΔTime/Sample_Interval. Following step 106, the system 100 proceeds to step 107.

In step 107, the system 100 updates Utilization_Array by discarding the oldest element in Utilization_Array and appending U as the newest element in Utilization Array. Following step 107, the system 100 proceeds to step 108. In step 108, the system 100 computes a cumulative utilization "Utilt" as the sum, for 1 thru N, Utilization_Array×$W_N$. Following step 108, the system 100 proceeds to step 109. In step 109, the system 100 reports Utilt to the display or to a CPU for post processing.

The initialization function of the example system 100 may also be described as assigning the assessment dwell an arbitrary revisit time (U_RVT) selected to satisfy system status update rates. U_RVT may be selected as any value between the smallest and largest revisit times of the dwells comprising the scan strategy. Given U_RVT, the system 100 defines an array of length (N) as: Max_RVT:=largest revisit time in the scan strategy. The system 100 defines N:=ceiling [Max_RVT/U_RVT] (the initial value of each of the N array elements is 1.0). The processing function of the example system 100 may be described as:

1) For each assessment dwell execution: Compute the ratio of time elapsed since the last execution divided by U_RVT, and store the ratio in the array, discarding the oldest array element, keeping the N most recent.
2) Compute an updated utilization metric as the weighted average of the N array elements. The weights may be all set to 1.0 (straight average), or may be biased.

As stated above, the conventional process estimates the utilization metric as the lag/lead of the slowest dwell in the scan strategy. Hence, the utilization metric's update rate cannot be easily controlled.

A system for estimating the utilization metric in accordance with the present invention allows for the selection of an arbitrary update rate, and the capability of intrinsic filtering via weight selection. If the utilization metric is an input to an operator's display, reasonable update behavior, or "refresh time", may be observed, even under scan strategy lag conditions (i.e., utilization greater than 1.0).

In accordance with the present invention, an example system 100 for estimating the utilization of an electromagnetic signal receiver 50 includes a detection module 52 for receiving electromagnetic signals from a surrounding environment. The electromagnetic signals are chronologically segregated into a plurality of dwells each with an elapsed time. A processing module 56 controls the scanning of the surrounding environment. The processing module 56 receives data about the signals from the detection module 52. The processing module 56 computes a plurality of utilizations by dividing each individual elapsed time (the time elapsed since a last execution) by a predetermined sample interval. The processing module further determines a total utilization by adding the plurality of utilizations.

An example computer program product in accordance with the present invention estimates the utilization of an electromagnetic signal receiver 50. The product includes a first instruction for receiving electromagnetic signals from a surrounding environment; a second instruction for creating data from the electromagnetic signals; a third instruction for chronologically segregating the electromagnetic signals into a plurality of dwells each with an elapsed time; a fourth instruction for controlling the scanning of the surrounding environment; a fifth instruction for computing a plurality of a utilizations by dividing each individual elapsed time by a predetermined sample interval; and a sixth instruction for determining a total utilization by adding the plurality of utilizations.

An example method in accordance with the present invention estimates the utilization of an electromagnetic signal receiver 50. The method includes the steps of: receiving electromagnetic signals from a surrounding environment; creating data from the electromagnetic signals; chronologically segregating the electromagnetic signals into a plurality of dwells each with an elapsed time; controlling the scanning of the surrounding environment; computing a plurality of a utilizations by dividing each individual elapsed time by a predetermined sample interval; and determining a total utilization by adding the plurality of utilizations.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

I claim:

1. A system for estimating the utilization of an electromagnetic signal receiver, said system comprising:
   a detection module for receiving electromagnetic signals from a surrounding environment, the electromagnetic signals being chronologically segregated into a plurality of dwells each with an elapsed time;
   a processing module for controlling the scanning of the surrounding environment, said processing module computing a plurality of a utilizations by dividing each individual elapsed time by a predetermined sample interval, said processing module receiving data about the signals from said detection module, said processing module further determining a total utilization by adding the plurality of utilizations.

2. The system as set forth in claim 1 wherein said processing module further multiplies each individual utilization by an individual predetermined weight corresponding to each of said plurality of utilizations prior to the determination of the total utilization.

3. The system as set forth in claim 1 wherein said processing module issues a command to said detection module for changing the frequency the signals that said detection module scans.

4. A computer program product for estimating the utilization of an electromagnetic signal receiver, said product comprising:

a first instruction for receiving electromagnetic signals from a surrounding environment;

a second instruction for creating data from the electromagnetic signals;

a third instruction for chronologically segregating the electromagnetic signals into a plurality of dwells each with an elapsed time;

a fourth instruction for controlling the scanning of the surrounding environment;

a fifth instruction for computing a plurality of a utilizations by dividing each individual elapsed time by a predetermined sample interval; and a sixth instruction for determining a total utilization by adding the plurality of utilizations.

5. The computer program product as set forth in claim 4 further comprising an instruction for declaring a utilization array that is N elements long.

6. The computer program product as set forth in claim 5 further comprising an instruction for initializing the value of each of the N elements in the utilization array to 1.0.

7. The computer program product as set forth in claim 4 further comprising an instruction for determining a maximum dwell/revisit time value of the plurality of dwells.

8. The computer program product as set forth in claim 4 further comprising an instruction for creating an assessment dwell having a revisit time value of the predetermined sample interval.

9. The computer program product as set forth in claim 4 further comprising an instruction for determining an elapsed time by subtracting a start time from a clock time.

10. The computer program product as set forth in claim 4 further comprising an instruction for reporting the total utilization to a computer display.

11. The computer program product as set forth in claim 4 further comprising an instruction for conducting further processing of data obtained from said fifth and sixth instruction.

12. The computer program product as set forth in claim 4 further comprising an instruction for updating a utilization array by discarding the oldest element in the utilization array.

13. The computer program product as set forth in claim 12 further comprising an instruction for updating the utilization array by appending the newest element in the utilization array.

14. The computer program product as set forth in claim 4 wherein said fourth instruction includes the issuing of commands to a receiver for varying the frequency of the electromagnetic signals received from the surrounding environment.

15. A method for estimating the utilization of an electromagnetic signal receiver, said method comprising the steps of:

receiving electromagnetic signals from a surrounding environment;

creating data from the electromagnetic signals;

chronologically segregating the electromagnetic signals into a plurality of dwells each with an elapsed time;

controlling the scanning of the surrounding environment;

computing a plurality of a utilizations by dividing each individual elapsed time by a predetermined sample interval; and determining a total utilization by adding the plurality of utilizations.

16. The method as set forth in claim 15 further comprising the step of declaring a utilization array that is N elements long and the step of initializing the value of each of the N elements in the utilization array to 1.0.

17. The method as set forth in claim 15 further comprising the step of determining a maximum dwell/revisit time value of the plurality of dwells.

18. The method as set forth in claim 15 further comprising the step of creating an assessment dwell having a revisit time value of the predetermined sample interval.

19. The method as set forth in claim 15 further comprising the step of determining each elapsed time by subtracting a temporarily fixed start time from a clock time.

20. The method as set forth in claim 15 further comprising the step of reporting the total utilization to a computer display and the step of conducting further processing of data obtained from said method.

* * * * *